United States Patent
Liu et al.

(10) Patent No.: US 9,772,707 B2
(45) Date of Patent: Sep. 26, 2017

(54) TOUCH SCREEN AND FABRICATION METHOD THEREOF

(71) Applicants: Xiamen Tianma Microelectronics Co., Ltd., Xiamen (CN); Tianma Microelectronics Co., Ltd., Shenzhen (CN)

(72) Inventors: Xiaomin Liu, Xiamen (CN); Ting Zhou, Xiamen (CN)

(73) Assignees: XIAMEN TIANMA MICROELECTRONICS CO., LTD., Xiamen (CN); TIANMA MICROELECTRONICS CO., LTD., Shenzhen (CN)

( * ) Notice: Subject to any disclaimer, the term of this patent is extended or adjusted under 35 U.S.C. 154(b) by 187 days.

(21) Appl. No.: 14/748,180

(22) Filed: Jun. 23, 2015

(65) Prior Publication Data
US 2016/0239141 A1    Aug. 18, 2016

(30) Foreign Application Priority Data
Feb. 13, 2015   (CN) .......................... 2015 1 0078846

(51) Int. Cl.
*G06F 3/041*    (2006.01)

(52) U.S. Cl.
CPC .. *G06F 3/0412* (2013.01); *G06F 2203/04103* (2013.01)

(58) Field of Classification Search
CPC ......... G06F 3/0412; G06F 2203/04103; G06F 3/044
See application file for complete search history.

(56) References Cited

U.S. PATENT DOCUMENTS

| 8,873,005 B2* | 10/2014 | Hsieh | G02F 1/133788 |
| | | | 349/123 |
| 2002/0159013 A1* | 10/2002 | Faris | G02B 5/3033 |
| | | | 349/124 |
| 2008/0001120 A1* | 1/2008 | Peglow | C09B 69/106 |
| | | | 252/299.1 |

(Continued)

FOREIGN PATENT DOCUMENTS

| CN | 101051143 A | 10/2007 |
| CN | 101464577 A | 6/2009 |

(Continued)

*Primary Examiner* — Ibrahim Khan
(74) *Attorney, Agent, or Firm* — Anova Law Group, PLLC

(57) ABSTRACT

A touch screen and fabrication method is provided. The touch screen includes a transparent substrate having a display region and a non-display region; a first polarizing film formed on the transparent substrate; and a second polarizing film formed on the first polarizing film. The first polarizing film includes a first region having a first polarization axis direction, and the first region is located in the non-display region along a vertical direction of the transparent substrate. The second polarizing film includes a second region having a second polarization axis direction, and the second region is located in the non-display region along the vertical direction of the transparent substrate. Further, the first polarization axis direction of the first region is perpendicular to second polarization axis direction of the second region.

20 Claims, 9 Drawing Sheets

(56) References Cited

U.S. PATENT DOCUMENTS

| | | | | |
|---|---|---|---|---|
| 2011/0310319 | A1* | 12/2011 | Mizusaki | G02B 5/3083 |
| | | | | 349/33 |
| 2013/0302539 | A1* | 11/2013 | Fujii | C08F 220/10 |
| | | | | 428/1.54 |
| 2014/0168529 | A1* | 6/2014 | Lin | G02F 1/13338 |
| | | | | 349/12 |
| 2016/0246113 | A1* | 8/2016 | Tang | G02F 1/1339 |

FOREIGN PATENT DOCUMENTS

| CN | 203966092 U | 11/2014 |
|---|---|---|
| CN | 104298394 A | 1/2015 |
| JP | 2015014976 A | 1/2015 |

\* cited by examiner

TOUCH SCREEN AND FABRICATION METHOD THEREOF

CROSS-REFERENCES TO RELATED APPLICATIONS

This application claims the priority of Chinese patent application No. CN201510078846.1, filed on Feb. 13, 2015, the entire content of which is incorporated herein by reference.

FIELD OF THE DISCLOSURE

The present disclosure relates to the field of display technology and, more particularly, relates to a touch screen and related fabrication techniques.

BACKGROUND

A touch screen, also known as a "touch-control screen" or a "touch-control panel," is an inductive liquid crystal display device capable of receiving touch input signals. When an icon on the touch screen is touched, the touch feedback system on the touch screen may drive connected devices based on pre-defined programs, thus a touch screen may be used to replace traditional mechanical-button-based panels. Further, the touch screen may create vivid visual/audio effect using images displayed on the liquid crystal display. Currently, touch screens are widely used in many fields and industries of modern societies because of such convenience.

Touch screens may be classified into various categories, such as glass-based inductive devices, thin-film-based inductive devices, and integrated inductive devices. The glass-based inductive devices include one glass solution (OGS) touch screens. The OGS touch screen is a protection screen of an electronic product, which is fabricated using a technique of forming a conductive indium tin oxide (ITO) film and sensors directly on a protective glass screen. Thus, one glass screen can have the dual functions of being a protection glass screen and being touch sensors. Compared with traditional touch screens, the OGS touch screens hold various advantages, such as simpler structure, lighter and thinner, better transparence, lower cost, and higher production yields.

However, the current OGS touch screen manufacturing may have certain issues. For example, the quality and production yield of the OGS touch screens may still need to be improved, and frames of the OGS touch screens may be easily broken off during the manufacturing process, which may cause open circuits and touch screen functional failures. The disclosure is directed to solve one or more problems set forth above and other problems.

BRIEF SUMMARY OF THE DISCLOSURE

One aspect of the present disclosure provides a touch screen. The touch screen includes a transparent substrate having a display region and a non-display region; a first polarizing film formed on the transparent substrate; and a second polarizing film formed on the first polarizing film. The first polarizing film includes a first region having a first polarization axis direction, and the first region is located in the non-display region along a vertical direction of the transparent substrate. The second polarizing film includes a second region having a second polarization axis direction, and the second region is located in the non-display region along the vertical direction of the transparent substrate. Further, the first polarization axis direction of the first region is perpendicular to second polarization axis direction of the second region.

Another aspect of the present disclosure provides touch screen fabrication method. The method includes providing a transparent substrate having a display region and a non-display region; forming a first polarizing film having a first organic film layer on the transparent substrate; and forming a first region having a first polarization axis direction in the first organic film at a location corresponding to the non-display region. The method also includes forming a second polarizing film having a second organic film layer on the first polarizing film; and forming a second region having a second polarization axis direction in the second organic film at a location corresponding to the non-display region. The first polarizing axis direction and the second polarization axis direction are perpendicular to each other.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
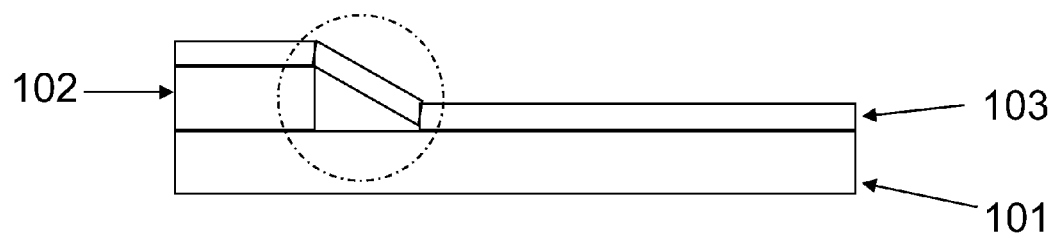
FIG. 1 illustrates a cross-sectional view of a conventional OGS touch screen.

FIG. 1 illustrates a conventional OGS touch screen. As shown in FIG. 1, the OGS touch screen includes a glass cover lens or glass substrate 101, a frame 102, and a transparent conductive layer 103. The frame 102 is formed along four sides of the glass substrate 101 in a step shape. Further, the frame 102 is made of black matrix or paint. The transparent conductive layer 103 is made of indium tin oxide (ITO) and is formed on top of the glass substrate 101 and the frame 102. Due the step shape, the frame 102 has significant level difference to the surface of the glass substrate 101 (the region circled by dotted line in FIG. 1). Thus, the formed transparent conductive layer 103 need to go from one level to another level, causing stress in the transparent conductive layer 103 during the fabrication process. Such stress can cause open circuit in the transparent conductive layer 103 and can further cause touch screen functional failure, lowering the fabrication yield.

In addition, because black matrix or paint of the frame 102 are used to reduce light transparence, black carbon may be added. Thus, the frame 102 may become conductive, which may further increase the risk of short-circuit in the transparent conductive layer 103. Moreover, when OGS touch screens are manufactured, a plurality of OGS touch screens may be formed together on a big glass substrate first, then the big glass substrate may be cut into small pieces to form individual OGS touch screens. During the cutting process, the black matrix or the paint in the frame 102 may fall off, causing light leakages.

Figure 2:
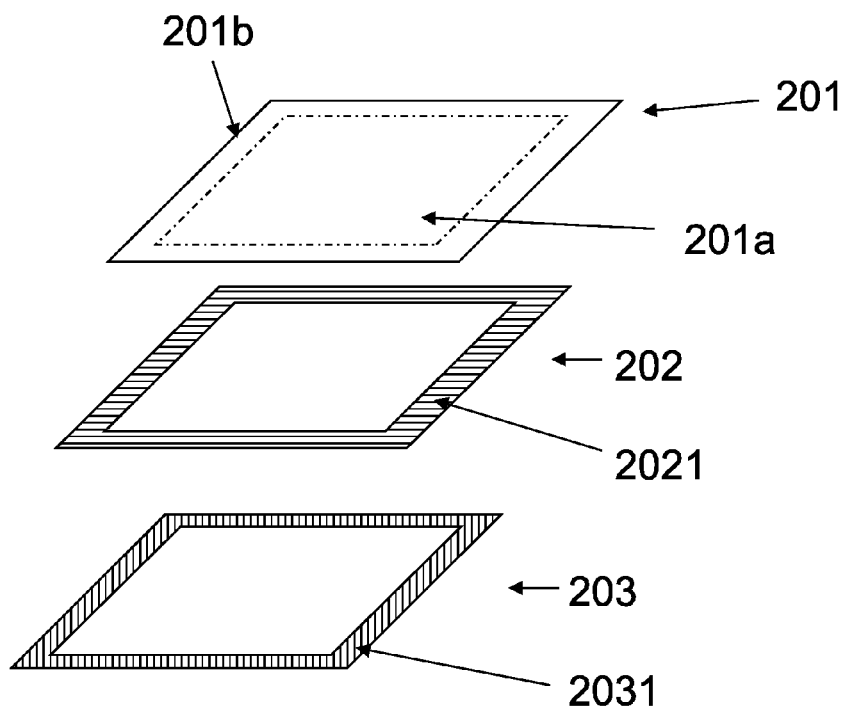
FIG. 2 illustrates an exploded view of an exemplary touch screen consistent with disclosed embodiments.
Figure 3:
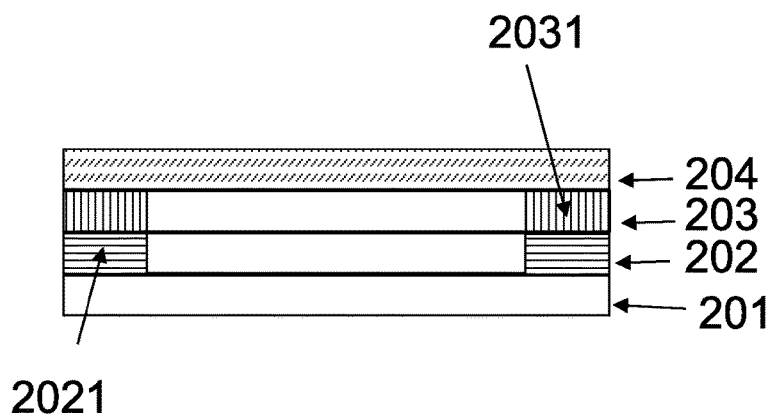
FIG. 3 illustrates a cross-sectional view of an exemplary touch screen consistent with disclosed embodiments.

To overcome the above issues and/or other issues, improved OGS touch screens are disclosed. FIG. 2 illustrates an exploded view of an exemplary touch screen consistent with disclosed embodiments, and FIG. 3 illustrates a cross-sectional view of an exemplary touch screen consistent with disclosed embodiments. For illustrative purposes, the touch screen described herein is an OGS touch screen. Other types of touch screen may also be included.

As shown in FIGS. 2-3, the touch screen may include a transparent cover lens or transparent substrate 201. In certain embodiments, the transparent substrate 201 may be made of glass. Other transparent materials may also be used.

The transparent substrate 201 may include a display region 201a and a non-display region 201b. The display regions 201a may allow light to pass, while the non-display region 201b may block the light from passing through.

Further, a first polarizing film 202 and a second polarizing film 203 may be formed on the transparent substrate 201, sequentially. The first polarizing film 202 may be formed on top of the transparent substrate 201. The first polarizing film 202 may include a first region 2021, which may have a first polarization axis direction. The first region 2021 may be located in the non-display region 201b of the transparent substrate 201 along the vertical direction. That is, the projection of the first region 2021 on the transparent substrate 201 is in the non-display region 201b. In one embodiment, the projection of the first region 2021 on the transparent substrate 201 may be completely overlapped with the non-display region 201b.

The second polarizing film 203 may be formed on top of the first polarizing film 202, and may include a second region 2031, which may have a second polarization axis direction. The second region 2031 may be located in the non-display region 201b of the transparent substrate 201 along the vertical direction. That is, the projection of the second region 2031 on the transparent substrate 201 is in the non-display region 201b. In one embodiment, the projection of the second region 2031 on the transparent substrate 201 may be completely overlapped with the non-display region 201b. Further, the projection of the second region 2031 on the transparent substrate 201 may be completely overlapped with the projection of the first region 2021 on the transparent substrate 201.

Further, the OGS touch screen may include a transparent conductive layer 204 formed on top of the second polarizing film 203. In certain embodiments, the first polarization axis direction of the first region 2021 and the second polarization axis direction of the second region 2031 may be perpendicular to each other. Thus, when light enters the non-display region 201b of the touch screen, after the light passes the non-display region 201b of the transparent substrate 201, the light enters the first polarizing film 202.

Because the first region 2021 of the first polarizing film 202 has the first polarization axis direction, the light passing through the first polarizing film 202 becomes linearly polarized light with a polarization direction parallel to the first polarization axis direction. That is, the light passing through the first region 2021 of the first polarizing film 202 may be linearly polarized light with the polarization direction parallel to the first polarization axis. The linearly polarized light from the first polarizing film 202 may then enter the second region 2031 of the second polarizing film 203.

However, because the second region 2031 of the second polarizing film 203 has the second polarization axis direction, which is perpendicular to the first polarization axis direction. The entering linearly polarized light may be completely blocked by the second polarizing film 203. That is, no light passes through the second region 2031 of the second polarizing film 203.

Figure 9:
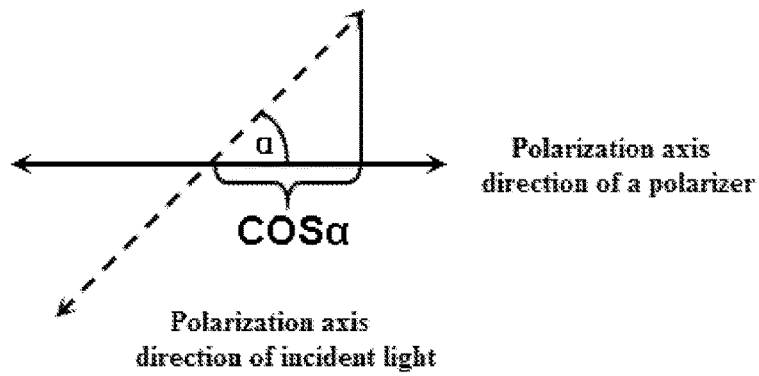
FIG. 9 illustrates a light transmittance mechanism consistent with disclosed embodiments.

FIG. 9 illustrates a light transmittance mechanism consistent with disclosed embodiments. As shown in FIG. 9, when an incident light entering a polarizer, the polarized direction of the incident light may have an angle α with the polarization axis of the polarizer, and the light intensity of the light passing the polarizer is the light intensity of the incident light multiplied by a factor of $\cos(\alpha)$.

Applying this mechanism on configurations shown in FIGS. 2-3, the polarized direction of the light passing the first region of the first polarizing film (i.e., the first polarization axis direction) has an angle α with the polarization axis direction of the second region of the second polarizing film (i.e., the second polarization direction). Thus, the light intensity of any light passing through the second region of the second polarizing film is $\cos(\alpha)$ times the light intensity of the light passing the first polarizing film.

However, the angle α between the first polarization axis direction of the first region of the first polarizing film and the second polarization axis direction of the second region of the second polarizing film is 90°, and $\cos(90°)$ is 0. Thus, the light intensity of the light passing the second region of the second polarizing film is also 0. That is, the light may be completely blocked by the second region of the second polarizing film, and the non-display region 201b of the transparent substrate 201 may become opaque.

Thus, by having the first polarizing film 202 and the second polarizing film 203 have perpendicular polarization axis directions, light may be completely blocked in the non-display region. At the same time, other regions outside the first region 2021 of the first polarizing film 202 and the second region 2031 of the second polarizing film 203, e.g., the display region 201a, have no polarization axis directions.

Thus, light may still be able to pass through the display region 201a of the transparent substrate 201 without blockage, and is able to display images. Further, because the first polarizing film 202 and the second polarizing film 203 may be flat or have a thin planar structures, when the transparent conductive layer 204 is formed on the second polarizing film 203, the transparent conductive layer 204 does not need to overcome substantial step difference. Thus, open circuit issues may be improved. Further, because the polarizing film might not contain conductive materials (e.g., black carbon), short circuit issues may also be improved.

The first polarizing film 202 and the second polarizing film 203 may be formed of any appropriate materials. In certain embodiments, the first polarizing film 202 and the second polarizing film 203 may be formed of organic materials. Other materials may also be used.

Specifically, the first polarizing film 202 and the second polarizing film 203 may include a first organic film layer and a second organic film layer, respectively. When exposed under polarized ultraviolet (UV) light, the first organic film layer and the second organic film layer may have alignment capability to form polarizing films.

For example, the first organic film layer and the second organic film layer may be made of polyamide doped with dichroic organic dyes. The dichroic organic dyes may have certain characteristics, such as high dichroism, uniform dyeing property, desired heat and moisture resistance, and no transformation or sublimation when heated, etc.

More particularly, the dichroic dyes may be the azo dyes. The azo dyes have a desired heat and moisture resistant property. The azo dyes may further include disazo and trisazo compounds having following representative chemical structural formulas (1) and (2):

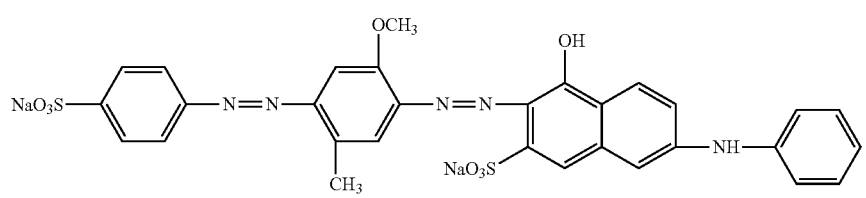

(1)

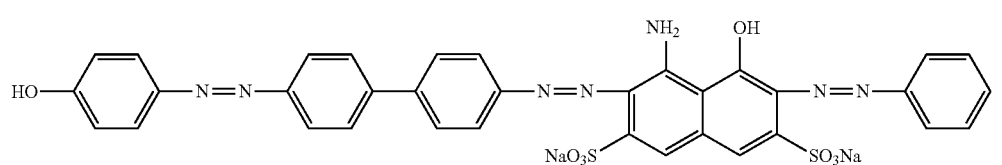

(2)

Further, electron donor groups or electron acceptor groups may be incorporated at the molecular terminals of the azo dyes to change the mobility of the pi bonds in the azo dye molecular. Thus, the light absorption capability and the light absorption bandwidth may be increased. The dyeing property of the dichroic dyes may then be improved. The chemical structural formulas of the electron donor groups or electron acceptor groups may be listed as follows:

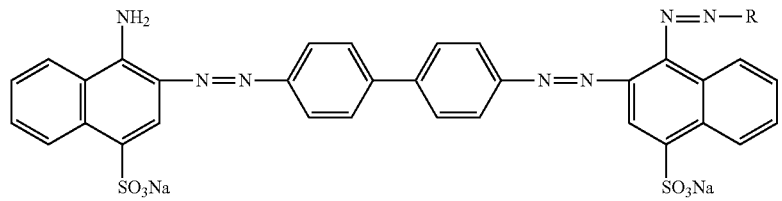

where R may be

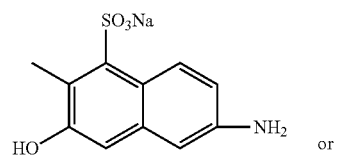

or

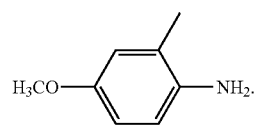

Alternatively or additionally, the dichroic dyes may also be the anthraquinone dyes

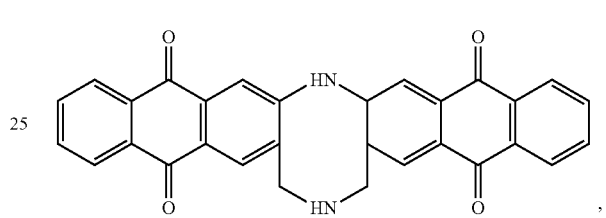

, the triphenyl dioxazine dyes and derivatives

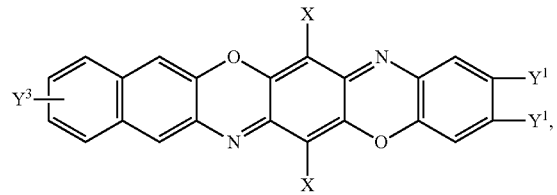

, the single-methine and poly-methine dyes

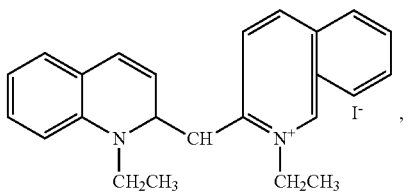

the biphenyl dyes, or the polycyclic dyes, etc. These dyes may be doped into the polyimide to make the organic film layer have the alignment capability when exposed under polarized UV light.

Further, the transparent conductive layer 204 may be made of tin-doped indium oxide (ITO), aluminum-doped zinc oxide (AZO), fluorine-doped tin oxide (FTO), gallium-doped zinc oxide, or other transparent conductive materials. In one embodiment, the transparent conductive layer 204 is made of the ITO.

Figure 4:
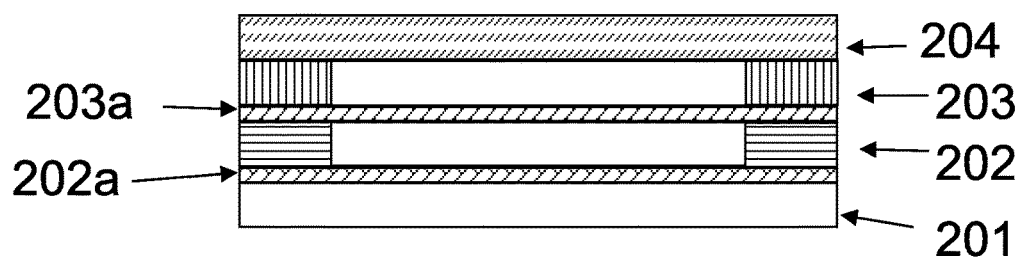
FIG. 4 illustrates a cross-sectional view of another exemplary touch screen consistent with disclosed embodiments.

FIG. 4 illustrates a cross-sectional view of another exemplary touch screen consistent with disclosed embodiments. As shown in FIG. 4, the touch screen may include a transparent substrate 201. A first polarizing film 202 and a second polarizing film 203 may be formed on the transparence substrate 201 sequentially.

The first polarizing film 202 may include a first base-material 202*a* and a first organic film layer disposed on the first base-material 202*a*. The second polarizing film 203 may include a second base-material 203*a* and a second organic film layer disposed on the second base-material 203*a*. The first organic film layer and the second organic film layer may be aligned along certain directions exposed under polarized UV light.

Further, a transparent conductive layer 204 may be formed on the second polarizing film 203. The transparent substrate 201 and the transparent conductive layer 204 may be similar to those described above, and detailed descriptions are omitted here.

The first base material layer and the second base material layer are added to the first polarizing film and the second polarizing film, respectively. The first base material and the second base material may be made of any appropriate flexible and transparent materials, such as polyimide.

Taking the polyimide as example, by adding the first base material on the first polarizing film and adding the second base material on the second polarizing film, the polarizing films located on the transparent substrate 201 may be detachable. More specifically, the edges of the polarizing film may be cut open using a laser cuter or a knife to expose the base materials, which may be flushed away using warm water. Thus, the polarizing films may be separated from the transparent substrate 201. Depending on application requirements, the polarizing film of the touch screen may also be replaced with the base material structures.

Accordingly, the present disclosure also provides a display device. The display device may include any of the above illustrated touch screens, as well as components for making the display device function normally. For example, the display device may include a display screen, such as an LCD display screen, an OLED display, etc., coupled together with the touch screen as a protection screen as well as touch screen.

Figure 5A:
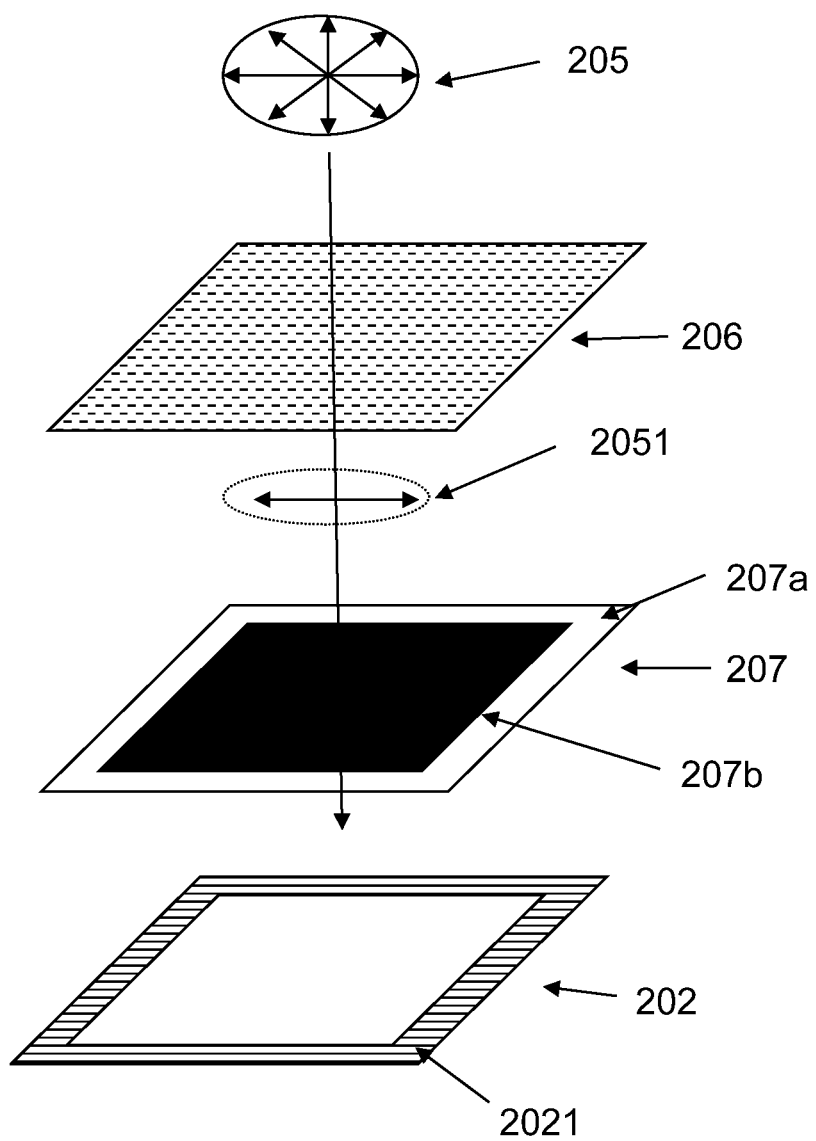
FIG. 5a-5b illustrate schematics of an exemplary touch screen fabrication process consistent with disclosed embodiments.
Figure 5B:
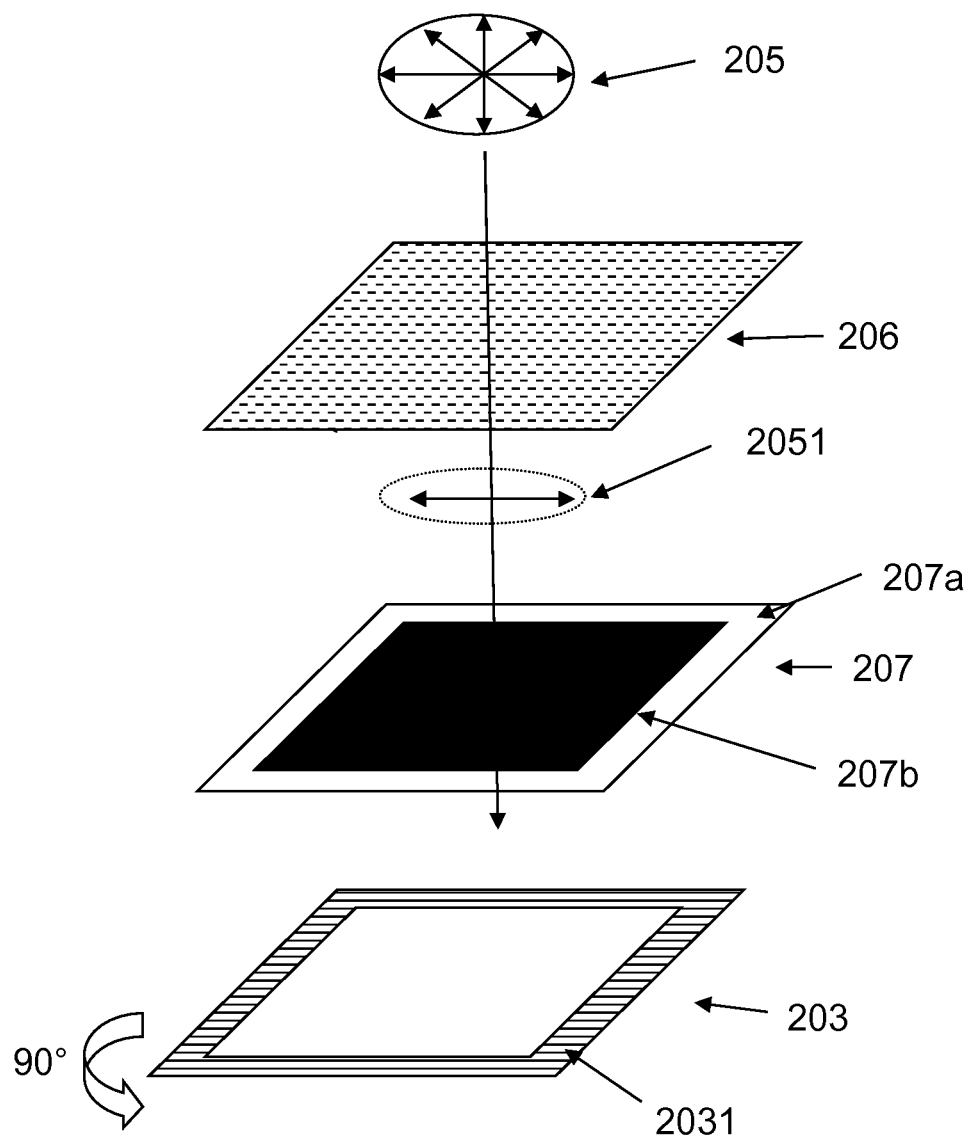
Figure 6A:
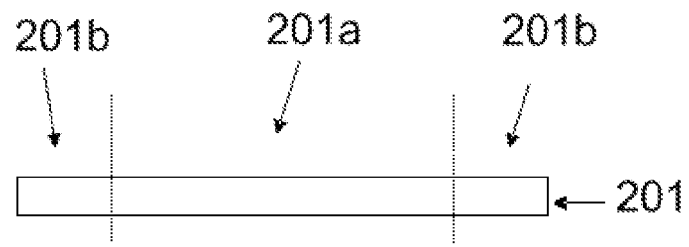
FIGS. 6a-6f illustrate cross-sectional views of a touch screen corresponding to certain stages of an exemplary touch screen fabrication process consistent with disclosed embodiments.
Figure 6B:
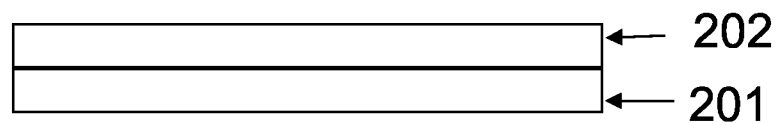
Figure 6C:
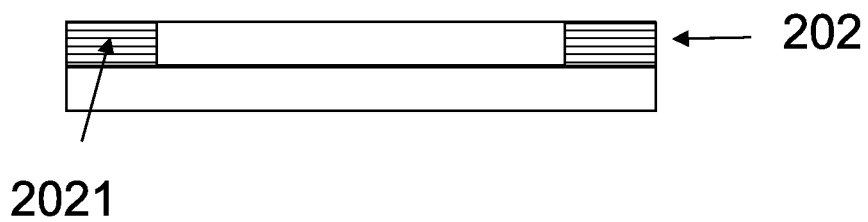
Figure 6D:
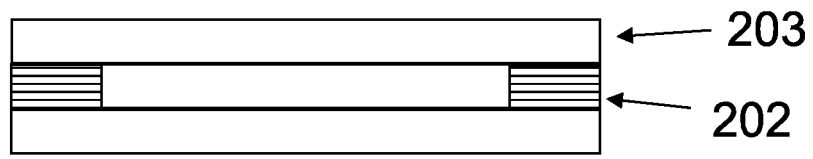
Figure 6E:
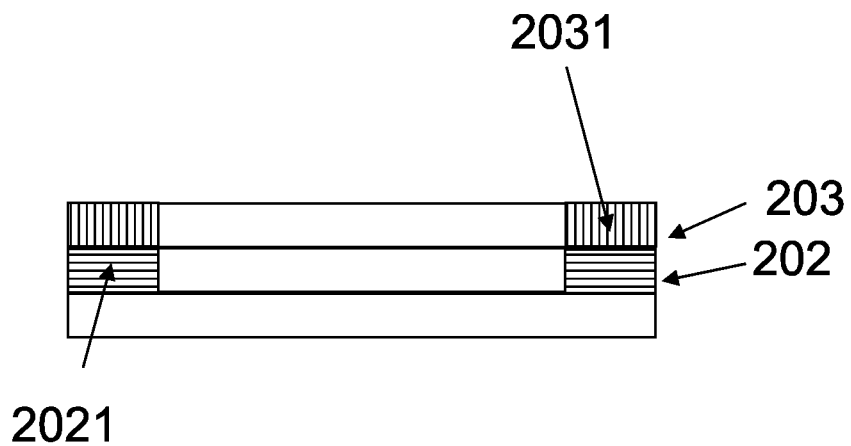
Figure 6F:
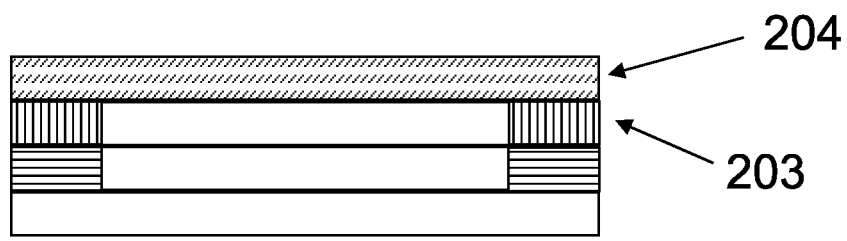
Figure 7:
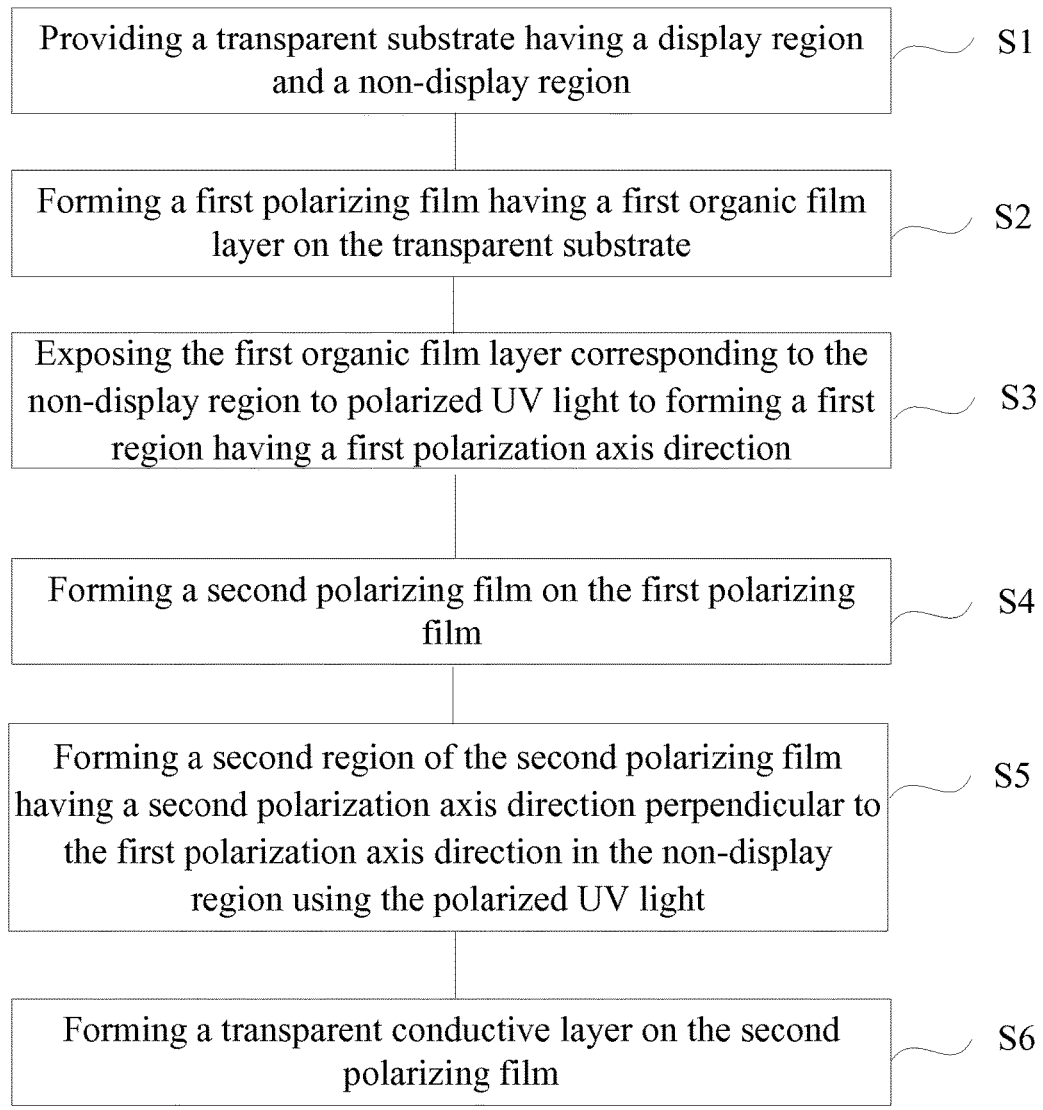
FIG. 7 illustrates a flow chart of an exemplary touch screen fabrication process consistent with disclosed embodiments.

FIG. 7 illustrates a flow chart of an exemplary touch screen fabrication process consistent with disclosed embodiments. FIGS. 6*a*-6*f* illustrate cross-sectional views of a touch screen corresponding to certain stages of an exemplary touch screen fabrication process consistent with disclosed embodiments. FIGS. 5*a*-5*b* illustrate schematics of an exemplary touch screen fabrication process for making aligned polarizing films.

As shown in FIG. 7, at the beginning of the touch screen fabrication process, a cover lens or transparent substrate having a display region and a non-display region is provided (S1). The transparent substrate may be a glass substrate. FIG. 6*a* illustrates a cross-sectional view of a corresponding structure.

As shown in FIG. 6*a*, a transparent substrate 201 is provided. The transparent substrate 201 may include a display region 201*a* and a non-display region 201*b*. The transparent substrate 201 may have a rectangle shape. The non-display region 201*b* may be located close to the peripheral edges of the transparent substrate 201.

Returning to FIG. 7, after providing the transparent substrate, a first polarizing film having a first organic film layer is formed on the transparent substrate 201 (S2). FIG. 6*b* illustrates a cross-sectional view of a corresponding structure.

As shown in FIG. 6*b*, a first polarizing film 202 may be formed on the transparent substrate 201. The first polarizing film 202 may include a first organic film layer, and the first organic film layer may be made of polyimide. More specifically, first, dichroic organic dye solution and polyimide precursor may be mixed together to form a mixture of dichroic organic dye doped polyimide precursor by a mixing process. Further, the mixture may be coated on the transparent substrate 201 by a coating process to form the first organic film layer. Further, the organic film layer may be pre-baked or pre-cured.

In one embodiment, the first organic film layer may be made of the dichroic organic dye doped polyimide precursor. The dichroic dye may be one of azo dye, anthraquinone dye, biphenyl dye, triphenyl dioxazine dye and derivatives, single-methine and poly-methine dye or polycyclic dye, etc. The pre-baking temperature may range from approximately 10° C. to 30° C.

Returning to FIG. 7, further, a first region having a first a polarization axis direction is formed by exposing the first organic film layer corresponding to the non-display region under polarized UV light (S3). FIG. 5*a* illustrates a schematic of a corresponding process, and FIG. 6*c* illustrates a cross-sectional view of a corresponding structure.

As shown in FIG. 6*c*, the first organic film layer of the first polarizing film 202 corresponding to the non-display region may be exposed under the polarized UV light to form a first region 2021.

As shown in FIG. 5*a*, to form the region 2021 of the first polarizing film 202, the first organic film layer of the first polarizing film 202 corresponding to the non-display region may be exposed under polarized UV light to form a first region 2021. Specifically, a UV light source may be provided and UV light 205 may be emitted by the UV light source. The UV light provided by the UV light source may have various polarization directions.

Further, the UV light 205 may pass through a metal grating or metal grid 206 disposed in front of the UV light source. When the UV light 205 passes through the metal grating 206, under the polarizer effect of the metal grating 206, UV light passing through the metal grating 206 becomes polarized UV light 2051.

A mask 207 having a transparent region 207*a* and an opaque region 207*b* may be placed between the metal gating 206 and the transparent substrate 201 and the first film layer 202. The mask 207 may be aligned in such way that the transparent region 207a is correspond to the non-display region of the transparent substrate 201, and the opaque region 207b is correspond to the display region of the transparent substrate 201.

Thus, after the polarized UV light passing though the mask 207, only the first region 2021 of the first polarizing film 202 is exposed. The exposed first organic film layer of the first polarizing film 202 in the first region 2021 (i.e., the dye molecules in the first region 2021) may be aligned to the same polarization direction as the polarized direction of the polarized UV light 2051 to form a polarizing film. Because the regions outside the first region 2021 on the first polarizing film, e.g., corresponding the display region of the transparent substrate 201, may not be exposed by the polarized UV light 2051, no polarization axis direction is formed and light may still pass through the display region. Because the entire surface of the transparent substrate is exposed under the UV light, such process may also referred as an entire-surface UV light alignment process.

That is, after the pre-bake or pre-cure process, the organic film layer may be exposed under polarized UV light to align the dichroic dye molecules in the polyimide to form a polarizing film in an exposure process. The energy of the polarized UV light used for the exposure process may range from approximately 800 mJ to 1000 mJ. After the exposure process, the organic film layer may be post-baked and then may be solidified or main-cured. The post baking temperature may range from approximately 90° C. to 130° C., and the post baking duration may range from approximately 90 seconds to 120 seconds. The solidifying process may use a temperature ranging from approximately 210° C. to 230° C., and the duration of the solidifying process may range from approximately 20 minutes to 50 minutes. In one embodiment, the post-baking temperature may be set at approximately 130° C., the post-baking duration may be approximately 120 seconds, the solidifying temperature may be set at approximately 230° C., and the solidifying duration may be approximately 30 minutes.

Returning to FIG. 7, after forming the first polarizing film, a second polarizing film may be formed on the first polarizing film (S4). FIG. 6d illustrates a cross-sectional view of a corresponding structure.

As shown in FIG. 6d, a second polarizing film 203 may be formed on the first polarizing film 202. The second polarizing film may include a second organic film layer. More specifically, polyamide may be coated on the surface of the first polarizing film 202 to form the second organic film layer forming the second polarizing film 203, similar to various processes described above with respect to the first polarizing film 202.

Returning to FIG. 7, a second region of the second polarizing film having a second polarization axis direction perpendicular to the first polarization axis direction is formed in the non-display region (S5). FIG. 5b illustrates a schematic of a corresponding process, and FIG. 6e illustrates a cross-sectional view of a corresponding structure consistent with disclosed embodiments.

As shown in FIG. 6e, the second organic film layer of the second polarizing film 203 corresponding to the non-display region may be exposed under the polarized UV light to form a second region 2031.

As shown in FIG. 5b, to form the region 2031 of the second polarizing film 203, the second organic film layer of the second polarizing film 203 corresponding to the non-display region may be exposed under polarized UV light to form a second region 2031. Specifically, the same arrangement as shown in FIG. 5a may also be used to form the second region 2031.

That is, the UV light source, the metal grating 206, the UV light 205 may be the same as shown FIG. 5a. However, the touch screen may be rotated 90° clockwise or counterclockwise. Then, the rotated second polarizing film corresponding to the non-display region may be exposed under the polarized UV light 2051 to form the second region.

Specifically, the UV light 205 may pass the metal gating 206 and may form polarized UV light 2051. A mask 207 having a transparent region 207a and an opaque region 207b may be aligned in such way that the transparent region 207a corresponds to the non-display region of the transparent substrate 201, and the opaque region 207b corresponds to the display region of the transparent substrate 201. In other words, the mask 207 may be provided according to the rotated touch screen/transparent substrate.

Thus, after the polarized UV light 2051 passing though the mask 207, only the second region 2031 of the second polarizing film 203 is exposed. The exposed second organic film layer of the second polarizing film 203 may be aligned to the same direction as the polarization axis direction of the polarized UV light 2051. At the same time, other regions on the second polarizing film corresponding the display region of the transparent substrate may not be exposed by the polarized UV light, thus no polarization axis direction is formed in these regions and light may still pass through these regions.

Because the touch screen is rotated 90° before exposing the second polarizing film 203 in the step S5, the first polarization axis direction of the first region 2021 of the first polarizing film 202 and the second polarization axis direction of the second region 2031 of the second polarizing film 203 may be perpendicular to each other. The projections of the first region, the second region, and the non-display region on the transparent substrate 201 may be overlapped or completely overlapped.

Alternatively or additionally, instead of rotating the touch screen for 90°, the metal gating may be rotated 90°. More specially, after exposing the first polarizing film 202, the metal gating 206 may be rotated 90° clockwise or counter clockwise, then the polarized UV light may be used to expose the second polarizing film 203 using the mask 207 to form the second region 2031 having the second polarization axis direction perpendicular to the first polarization axis direction.

Returning to FIG. 7, after forming the first polarizing film and the second polarizing film, a transparent conductive layer is formed on the second polarizing film (S6). FIG. 6f illustrates a cross-sectional view of a corresponding structure.

As shown in FIG. 6f, a transparent conductive layer 204 may be formed on the second polarizing film 203 using a plurality of processes including, for example, spin coating, etching, etc.

Thus, an OGS touch screen may be formed, where the first polarizing film and the second polarizing film formed on the glass substrate may all have flat structures and provide light-blocking functionality. Thus, when forming the transparent conductive layer on the second polarizing film, the transparent conductive layer may not need to spread over step structures. As a result, related open circuit problems may be avoided. Further, because the polarizing films may not contain conductive materials (e.g., carbon black), short circuit problems may also be avoided.

Figure 10:
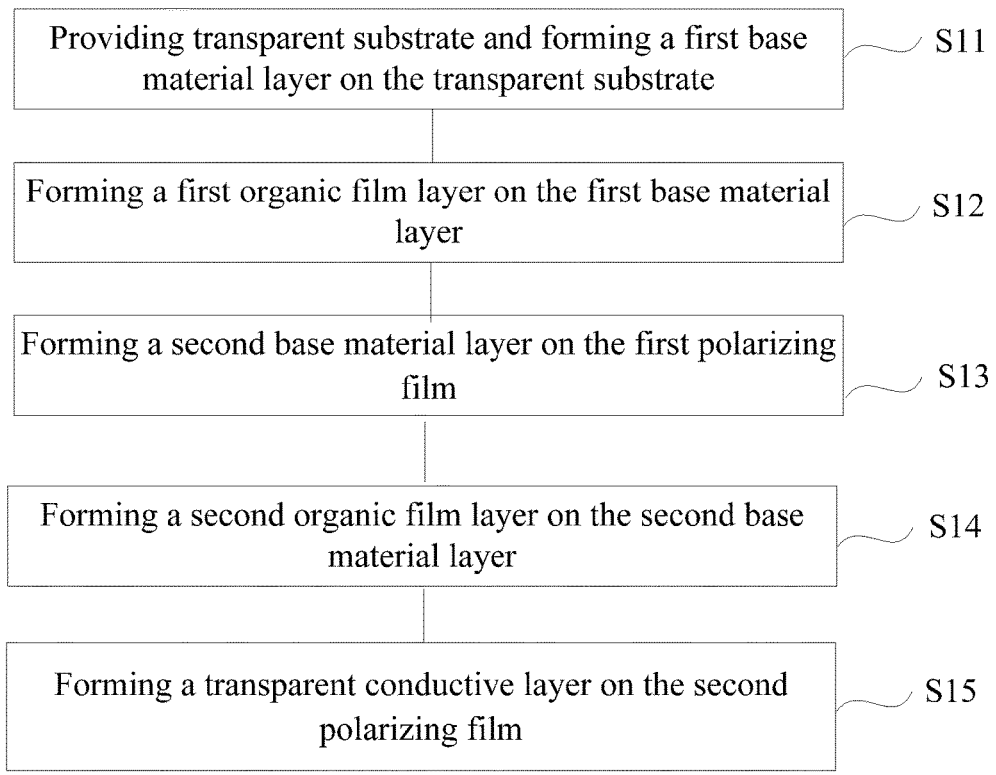
FIG. 10 illustrates a flow chart of another exemplary touch screen fabrication process consistent with disclosed embodiments.

FIG. 10 illustrates a flow chart of another exemplary touch screen fabrication process, and FIGS. 8a-8f illustrate cross-sectional views of a touch screen corresponding to certain stages of another exemplary touch screen fabrication process consistent with disclosed embodiments. The fabrication process has similar steps as illustrated in the previous embodiments, details of which may be omitted and certain differences may be illustrated below in details.

Figure 8A:
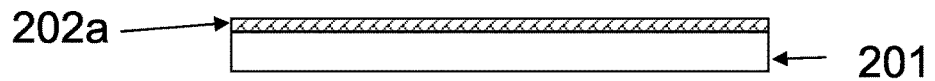
FIGS. 8a-8e illustrate cross-sectional views of another exemplary touch screen corresponding to various stages of an exemplary touch screen fabrication process consistent with disclosed embodiments.

As shown in FIG. 10, at the beginning of the OGS touch screen fabrication process, a transparent substrate is provided and a first base material layer is form on the transparent substrate (S11). FIG. 8a illustrates a cross-sectional view of a corresponding structure.

As shown in FIG. 8a, a transparent substrate 201 may be provided and a first base material layer 202a may be formed on the transparent substrate 201. The transparent substrate 201 may be in a rectangular shape, and the first base material layer 202a may be a flexible base substrate. More specifically, polyimide solution may be coated on the transparent substrate 201, pre-baked, UV light exposed, and solidified to form the first base material layer 202a.

Figure 8B:
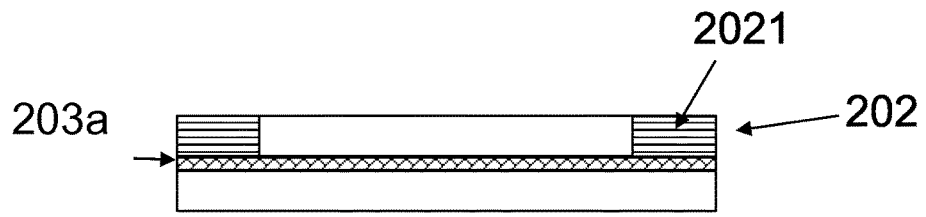

Returning to FIG. 10, further, a first organic film layer may be formed on the first base material layer (S12). FIG. 8b illustrates a cross-sectional view of a corresponding structure.

As shown in FIG. 8b, a first organic film layer may be formed on the first base material layer 202a. The first base material layer 202a and the first organic film layer together may form a first polarizing film 202. Further, the first polarizing film 202 may include a first region 2021 having a first polarizing axis direction and a transparent region similar to those illustrated in the previous embodiments.

Figure 8C:
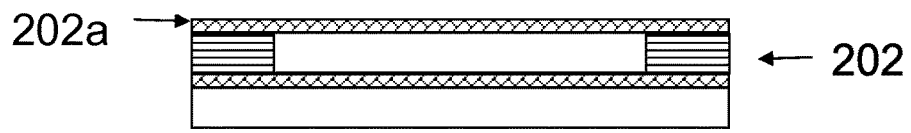

Returning to FIG. 10, further, a second base material layer is formed on the first polarizing film (S13). FIG. 8c illustrates a cross-sectional view of a corresponding structure.

As shown in FIG. 8c, a second base material layer 203a may be formed on the first polarizing film 202. The second base material layer 203a may be a flexible substrate. More specifically, polyimide solution may be coated on the first polarizing film 202, pre-baked, UV light exposed, and solidified to form the second base material layer 203a.

Figure 8D:
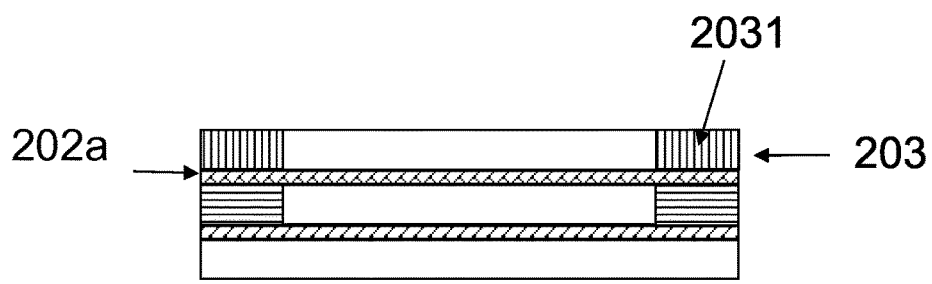

Returning to FIG. 10, further, a second organic film layer is formed on the second base material layer (S14). FIG. 8d illustrates a cross-sectional view of a corresponding structure.

As shown in FIG. 8d, a second organic film layer may be formed on the second base material layer 203a. The second base material layer 203a and the second organic film layer together may form a second polarizing film 203. Further, the second polarizing film 203 may include a second region 2031 having a second polarizing axis direction and a transparent region similar as illustrated in the previous embodiments. Moreover, before performing the UV light exposure process, the second polarizing film may be rotated 90°, thus the first polarization axis direction of the first region of the first polarizing film and the second polarization axis direction of the second region of the second polarizing film may be perpendicular to each other.

Figure 8E:
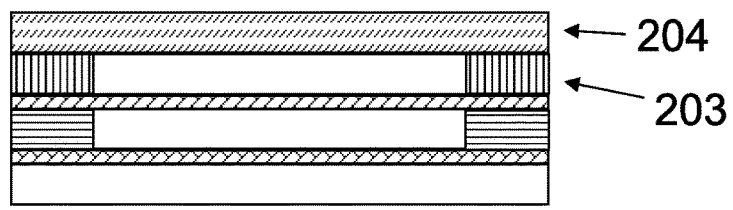

Returning to FIG. 10, further, a transparent conductive layer is formed on the second polarizing film (S15). FIG. 8e illustrates a cross-sectional view of a corresponding structure.

As shown in FIG. 8e, a transparent conductive layer 204 may be formed on the second polarizing film 203. An OGS touch screen may be obtained.

Compared to the previous embodiments, the polarizing films in the OGS touch screen may be detachable. For example, the edge of the polarizing film may be cut open using a layer cutter or a knife, then warm water may be used to flush the base materials to separate the polarizing films from the transparent substrate 201.

Thus, the disclosed first polarizing film and second polarizing film may all have flat structures. When forming the transparent conductive layer on the second polarizing film, the transparent conductive layer may not need to spread over step structures. As a result, open circuit problems may be avoided. Further, because the polarizing film may not contain conductive materials (e.g., carbon black), short circuit problems may also be avoided.

Embodiments consistent with the current disclosure provide a touch screen and a fabrication method thereof. The glass transparent substrate of the OGS touch screen, the ITO formation methods and locations are illustrated in detail. Touch screens consistent with the disclosed embodiment may be used in various display devices, such as cellphones and big-screen displays. A display may further include other components such as an LCD display module (not illustrated in the present disclosure). The modification of the touch screen (e.g., setting two polarizing films have polarizing axis directions perpendicular to each other in the non-display region) consistent with the present disclosure may be applied to display panel structures in various other applications.

Other applications, advantages, alternations, modifications, or equivalents to the disclosed embodiments are obvious to those skilled in the art. It is intended that the specification and embodiments be considered as exemplary only, with a true scope and spirit of the invention being indicated by the claims.

What is claimed is:

1. A touch screen, comprising:
   a transparent substrate having a display region and a non-display region;
   a first polarizing film formed on the transparent substrate, wherein the first polarizing film includes a first region having a first polarization axis direction and a third region, and the first region is located in the non-display region along a vertical direction of the transparent substrate, and the third region is located in the display region along the vertical direction of the transparent substrate; and
   a second polarizing film formed on the first polarizing film, wherein the second polarizing film includes a second region having a second polarization axis direction and a fourth region, and the second region is located in the non-display region along the vertical direction of the transparent substrate, and the fourth region is located in the display region along the vertical direction of the transparent substrate,
   wherein the first polarization axis direction of the first region is perpendicular to second polarization axis direction of the second region, and
   the third region of the first polarizing film and the fourth region of the second polarizing film have no polarization axis directions.

2. The touch screen according to claim 1, further including:
   a transparent conductive layer formed on the second polarizing film.

3. The touch screen according to claim 2, wherein:
   the transparent conductive layer is made of indium tin oxide (ITO).

4. The touch screen according to claim 1, wherein:
the first polarizing film includes a first organic film layer capable of being aligned when exposed under polarized UV light; and
the second polarizing film includes a second organic film layer capable of being aligned when exposed under polarized UV light.

5. The touch screen according to claim 4, wherein:
the first polarizing film further includes a first flexible transparent layer and the first organic film layer is formed on the first flexible transparent layer; and
the second polarizing film further includes a second flexible transparent layer and the second organic film layer is formed on the second flexible transparent layer.

6. The touch screen according to claim 4, wherein:
the first organic film layer and the second organic film layer are made of dichroic organic dye polyimide; and
the dichroic organic dye includes one of azo dye, anthraquinone dye, biphenyl dye, triphenyl dioxazine dye and derivatives, single-methine and poly-methine dyes and polycyclic dye.

7. The touch screen according to claim 1, wherein:
projection of the first region of the first polarizing film on the transparent substrate and projection of the second region of the second polarizing film on the transparent substrate are overlapped.

8. The touch screen according to claim 1, wherein:
the transparent substrate is a glass substrate.

9. A display device comprising the touch screen according to claim 1.

10. A touch screen fabrication method, comprising:
providing a transparent substrate having a display region and a non-display region;
forming a first polarizing film having a first organic film layer on the transparent substrate; forming a first region having a first polarization axis direction in the first organic film at a location corresponding to the non-display region and a third region in the first organic film at a location corresponding to the display region;
forming a second polarizing film having a second organic film layer on the first polarizing film; and
forming a second region having a second polarization axis direction in the second organic film at a location corresponding to the non-display region and a fourth region in the second organic film at a location corresponding to the display region,
wherein the first polarizing axis direction and the second polarization axis direction are perpendicular to each other, and
the third region of the first polarizing film and the fourth region of the second polarizing film have no polarization axis directions.

11. The touch screen fabrication method according to claim 10, further including:
forming a transparent conductive layer on the second polarizing film.

12. The touch screen fabrication method according to claim 10, wherein:
the first polarizing film further includes a first layer and the first organic film layer formed on the first layer; and
the second polarizing film further includes a second layer and the second organic film layer formed on the second layer.

13. The touch screen fabrication method according to claim 10, wherein:
the first region is formed by exposing the first organic film layer to a polarized UV light; and the second region is formed by exposing the second organic film layer to the polarized UV light after the touch screen is rotated 90°.

14. The touch screen fabrication method according to claim 13, wherein:
the polarized UV light is obtained by passing UV light through polarizer and a mask.

15. The touch screen fabrication method according to claim 10, wherein:
the first organic film layer and the second organic film layer are formed by coating a layer of dichroic dye doped polyimide precursor; and the dichroic dye includes azo dye, anthraquinone dye, biphenyl dye, triphenyl dioxazine dye and derivatives, single-methine and poly-methine dyes and polycyclic dye.

16. The touch screen fabrication method according to claim 10, wherein:
a prebake process is performed to the first/second organic film layers respectively prior to the first/second organic film layer being exposed to polarized UV light; and
a post bake process and a solidifying process are performed to the first/second organic film layers respectively after the first/second organic film layers being exposed by polarized UV light to solidify the first/second organic film layers.

17. A touch screen fabrication method, comprising:
providing a transparent substrate having a display region and a non-display region;
forming a first polarizing film having a first organic fi layer on the transparent substrate; filming a first region having a first polarization axis direction in the first organic film at a location corresponding to the non-display region;
forming a second polarizing film having a second organic film layer on the first polarizing film; and
forming a second region having a second polarization axis direction in the second organic film at a location corresponding to the non-display region,
wherein the first polarizing axis direction and the second polarization axis direction are perpendicular to each other;
a prebake process is performed to the first/second organic film layers respectively prior to the first/second organic film layer being exposed to polarized UV light;
a post bake process and a solidifying process are performed to the first/second organic film layers respectively after the first/second organic film layers being exposed by polarized UV light to solidify the first/second organic film layers;
a prebaking temperature of the prebake process ranges approximately from 10° C. to 30° C.;
the polarized UV light has an energy ranging approximately from 800 mJ to 1000 mJ; a post baking temperature of the post bake process ranges approximately from 90° C. to 120° C.;
a post baking duration of the post bake process ranges approximately from 90 seconds to 120 seconds;
a solidifying temperature of the solidifying process ranges approximately from 210° C. to 230° C.; and
a solidifying duration of the solidifying process ranges approximately from 20 minutes to 50 minutes.

18. The touch screen fabrication method according to claim 10, wherein:
projection of the first region on the transparent substrate and projection of the second region on the transparent substrate are overlapped completely.

19. The touch screen fabrication method according to claim 10, wherein:

the transparent, substrate is transparent and is made of glass; and the transparent conductive layer is made of indium tin oxide (ITO).

20. The touch screen fabrication method according to claim 10, wherein:
the first region is formed by exposing the first organic film layer to a polarized UV light; the polarized UV light is obtained by passing UV light through a polarizer and a mask; and
the second region is formed by exposing the second organic film layer to the polarized UV light after the polarizer is rotated 90°.

\* \* \* \* \*